(12) United States Patent
Kawaguchi et al.

(10) Patent No.: US 10,214,110 B2
(45) Date of Patent: Feb. 26, 2019

(54) POWER SUPPLY DEVICE FOR VEHICLES

(71) Applicant: Caterpillar SARL, Geneva (CH)

(72) Inventors: Atsushi Kawaguchi, Tokyo (JP); Kenji Yokohata, Tokyo (JP)

(73) Assignee: Caterpillar SARL, Geneva (CH)

( * ) Notice: Subject to any disclaimer, the term of this patent is extended or adjusted under 35 U.S.C. 154(b) by 105 days.

(21) Appl. No.: 15/114,244

(22) PCT Filed: Feb. 4, 2015

(86) PCT No.: PCT/EP2015/052250
§ 371 (c)(1),
(2) Date: Jul. 26, 2016

(87) PCT Pub. No.: WO2015/117986
PCT Pub. Date: Aug. 13, 2015

(65) Prior Publication Data
US 2017/0001526 A1  Jan. 5, 2017

(30) Foreign Application Priority Data

Feb. 4, 2014 (JP) .................. 2014-019705

(51) Int. Cl.
*B60L 11/18* (2006.01)
*B60R 16/033* (2006.01)
(Continued)

(52) U.S. Cl.
CPC ........... *B60L 11/18* (2013.01); *B60L 11/1855* (2013.01); *B60L 11/1866* (2013.01); *B60L 11/1868* (2013.01); *B60R 16/033* (2013.01); *B60R 16/04* (2013.01); *F02N 11/087* (2013.01); *F02N 11/0866* (2013.01);
(Continued)

(58) Field of Classification Search
CPC .. B60L 11/18; B60L 11/1855; B60L 11/1866; B60L 11/1868; B60R 16/033; B60R 16/04; F02N 11/0866; F02N 11/087; H02J 7/0014; H02J 7/1423; H02J 2001/008
See application file for complete search history.

(56) References Cited

U.S. PATENT DOCUMENTS 3,158,701 A   11/1964  Nadeau
4,045,718 A    8/1977  Gray
(Continued)

FOREIGN PATENT DOCUMENTS

DE  10057259 A1  5/2002
EP   0116213 A1  8/1984
(Continued)

OTHER PUBLICATIONS

European Patent Office, International Search Report in International Patent Application No. PCT/EP2015/052250, dated Apr. 20, 2015, 3 pp.

Primary Examiner — Levi Gannon

(57) ABSTRACT

Power supply device includes a power supply circuit with a low voltage load circuit and a high voltage load circuit connected to a plurality of batteries connected in series. A power supply circuit includes an equalizer that can prevent uneven consumption of each battery; a disconnect switch that enables the battery on the low voltage side to be electrically cut off; and a disconnect relay that enables the battery on the high voltage side to be electrically cut off. A machine controller starts an engine controller by turning on an engine key relay after turning on the disconnect relay.

3 Claims, 4 Drawing Sheets

(51) Int. Cl.
  *B60R 16/04*    (2006.01)
  *F02N 11/08*    (2006.01)
  *H02J 7/14*     (2006.01)
  *H02J 1/08*     (2006.01)
  *H02J 7/00*     (2006.01)
  *H02J 1/00*     (2006.01)

(52) U.S. Cl.
  CPC ............ *H02J 1/08* (2013.01); *H02J 7/0014* (2013.01); *H02J 7/1423* (2013.01); *H02J 2001/008* (2013.01)

(56) References Cited

U.S. PATENT DOCUMENTS

| | | | | |
|---|---|---|---|---|
| 4,723,105 A * | 2/1988 | Matouka | ............... | H02J 7/1423 307/16 |
| 4,754,730 A | 7/1988 | Campagna | | |
| 2002/0167291 A1* | 11/2002 | Imai | ............... | H02J 7/0018 320/119 |
| 2009/0146610 A1* | 6/2009 | Trigiani | ............... | H02J 7/0018 320/119 |
| 2012/0056478 A1* | 3/2012 | Omoto | ............... | B60L 3/0046 307/11 |
| 2015/0357843 A1* | 12/2015 | Kobayashi | ............... | H02J 7/0016 320/118 |

FOREIGN PATENT DOCUMENTS

| | | |
|---|---|---|
| JP | 59-139887 A | 8/1984 |
| JP | 2000-060019 A | 2/2000 |
| JP | 2002-171691 A | 6/2002 |
| JP | 2010-093979 A | 4/2010 |
| JP | 2013-135489 A | 7/2013 |
| WO | WO 2012/060766 A1 | 5/2012 |

\* cited by examiner

22 CIRCUIT BREAKING SWITCH
41 OTHER CIRCUIT BREAKING SWITCH

42 DUAL-TYPE CIRCUIT BREAKING SWITCH
42a CIRCUIT BREAK CONTACT
42b CIRCUIT BREAK CONTACT

24 ENGINE KEY SWITCH
43 CIRCUIT CUTOFF RELAY

POWER SUPPLY DEVICE FOR VEHICLES

CROSS-REFERENCE TO RELATED APPLICATIONS

This application is a national phase application of International Patent Application No. PCT/EP2015/052250, filed Feb. 4, 2015, which claims priority to Japanese Patent Application No. JP 2014-019705, filed Feb. 4, 2014, both of which are incorporated by reference herein in their entireties for all purposes.

TECHNICAL FIELD

The present invention relates to a power supply device for vehicles that has a power supply circuit in which different voltage loads are connected to a plurality of batteries.

BACKGROUND ART

In general, a 24 V power supply is used in a diesel engine having large engine displacement, and a 24 V power supply is used in a working machine such as a relatively large-sized hydraulic excavator for both an electrical system of a machine body and an electrical system of an engine.

However, an engine having smaller engine displacement than that of a conventional model can be used in a relatively small-sized hydraulic excavator and the like, and an engine of this class mainly uses a 12 V power supply for the electrical system, which is different from a 24 V power supply for the electrical system of the machine body. To change the electrical system of the engine to 24 V to match the electrical system of the machine body, or to change the electrical system of the machine body to 12 V to match the electrical system of the engine requires much development cost and a long development period. Therefore, it is desirable to use power circuits of 12 V and 24 V by using two 12 V batteries (refer to Patent Literature 1 and 2, for example).

Further, as shown in FIG. 6, a power supply device for vehicles that has a power supply circuit having a low voltage load circuit 3 and a high voltage load circuit 4 connected to a plurality of batteries 1 and 2 connected in series uses a technique that an equalizer (battery balancer) 6 is connected to a ground 5 and to circuits 3a and 4a that output a low voltage and a high voltage from the plurality of batteries 1 and 2 to the low voltage load circuit 3 and the high voltage load circuit 4 so that the equalizer 6 prevents unsymmetrical wear of the batteries 1 and 2.

Further, there is a technique that, in a ground circuit 5a that connects the ground 5 and a minus terminal (−) of one of the batteries 1 and 2 connected in series, which is connected to the ground 5, there is provided a circuit breaking switch (hereinafter, a disconnect switch) 7 that can break the circuit 5a so that the disconnect switch 7 mechanically breaks the ground circuit 5a to prevent battery exhaustion at a vehicle maintenance work time or during a long-term storage. A stator motor 8 and an alternator 9 of the vehicle are connected in parallel to the high voltage load circuit 4.

Patent Literature 1: Japanese Patent Application Publication No. 2010-093979

Patent Literature 2: Japanese Patent Application Publication No. 2013-135489

DISCLOSURE OF THE INVENTION

As described above, although the equalizer 6 and the disconnect switch 7 have respective advantages, when the equalizer 6 and the disconnect switch 7 are combinedly applied to the power supply circuit, there is a problem in that one battery 2 is also exhausted when a disconnect switch breaks the circuit because of the circuit configuration.

That is, although the equalizer 6 is usually used to prevent unsymmetrical wear of the plurality of batteries 1 and 2, when the circuit between the minus terminal (−) of the battery 1 and the ground 5 is broken by off-operation of the disconnect switch 7, there occurs a new problem of unsymmetrical wear of the batteries that the battery 2 is exhausted caused by an internal resistance of the equalizer 6.

The present invention has been made in view of the above points, and, in a power supply circuit in which a low voltage load circuit and a high voltage load circuit are connected to a plurality of series-connected batteries, an object of the invention is to provide a power supply device for vehicles that can prevent the occurrence of unsymmetrical wear of the batteries caused by an internal resistance of an equalizer in the case of combinedly using the equalizer and the circuit breaking switch.

The invention described in claim 1 is a power supply device for vehicles that has a low voltage load circuit which is connected to a part of a plurality of batteries connected in series, and a high voltage load circuit that is connected to the plurality of batteries and that operates at a higher voltage than the low voltage load circuit. The power supply device for vehicles includes an equalizer that is connected to the plurality of batteries and that prevents unsymmetrical wear of the batteries, a circuit breaking switch that can electrically cut off one of batteries connected in series, and circuit breaking means that can electrically cut off the other of the batteries connected in series.

The invention described in claim 2 is the power supply device for vehicles according to claim 1, wherein the power supply device for vehicles includes an engine key switch for starting an engine. The high voltage load circuit includes a machine controller that is started by turning on the engine key switch. The circuit breaking means includes a circuit cutoff relay that is energized by being turned on by the started machine controller. The low voltage load circuit includes an engine key relay that is turned on by the machine controller in a state where the circuit cutoff relay is set to the on state, an engine controller that is started by turning on the engine key relay, and an electrical appliance that can be energized by the start of the engine controller.

The invention described in claim 3 is the power supply device for vehicles according to claim 1, wherein the circuit breaking means is another circuit breaking switch that is provided separately from the circuit breaking switch.

The invention described in claim 4 is the power supply device for vehicles according to claim 1, wherein the power supply device for vehicles includes a dual-type circuit breaking switch that has two circuit break contacts which are integrally turned on and off. The circuit breaking switch is one circuit break contact of the dual-type circuit breaking switch. The circuit breaking means is the other circuit break contact of the dual-type circuit breaking switch.

The invention described in claim 5 is the power supply device for vehicles according to claim 1, wherein the power supply device for vehicles includes an engine key switch for starting an engine. The circuit breaking means includes a circuit cutoff relay that is turned on in conjunction with the on-operation of the engine key switch.

According to the invention described in claim 1, in using the power supply circuit having the low voltage load circuit and the high voltage load circuit connected to the plurality of batteries which are connected in series, the circuit breaking switch that can electrically cut off one of the batteries connected in series and the circuit breaking means that can electrically cut off the other battery can prevent the occurrence of unsymmetrical wear of the batteries caused by the internal resistance of the equalizer in the case of combinedly using the equalizer and the circuit breaking switch.

According to the invention described in claim 2, the circuit cutoff relay can prevent the occurrence of unsymmetrical wear of batteries caused by the internal resistance of the equalizer in the case of combinedly using the equalizer and the circuit breaking switch. At the start time of the engine, the machine controller controls the circuit cutoff relay to the on state prior to the engine key relay so that the equalizer is led to function before starting the engine controller by the engine key relay. Consequently, the excess current from the equalizer to the electrical appliance that occurs in conjunction with the start of the engine controller can be prevented, and the equalizer of a smaller size can be also applied.

According to the invention described in claim 3, the circuit breaking switch cuts off one battery, and the other circuit breaking switch as circuit breaking means cuts off the other battery. Therefore, it is possible to prevent the occurrence of unsymmetrical wear of the batteries caused by the internal resistance of the equalizer in the case of combinedly using the equalizer and the circuit breaking switch.

According to the invention described in claim 4, the dual-type circuit breaking switch can prevent the occurrence of unsymmetrical wear of batteries caused by the internal resistance of the equalizer in the case of combinedly using the equalizer and the circuit breaking switch. Also, by the off-operation of only the dual-type circuit breaking switch, two circuit break contacts can be simultaneously set to the off state. Therefore, better operability is provided, and the failure in cutoff of one battery can be prevented.

According to the invention described in claim 5, the circuit cutoff relay can prevent the occurrence of unsymmetrical wear of batteries caused by the internal resistance of the equalizer in the case of combinedly using the equalizer and the circuit breaking switch. Also, the circuit cutoff relay is automatically set to the off state in conjunction with the off-operation of the engine key switch. Therefore, for the battery cutoff operation, it is sufficient to operate only one circuit breaking switch, and the failure in cutoff of a battery other than the circuit breaking switch can be prevented.

BEST MODE FOR CARRYING OUT THE INVENTION

Hereinafter, embodiments of the present invention will be described in detail with reference to FIG. 1 to FIG. 5.

Figure 1:
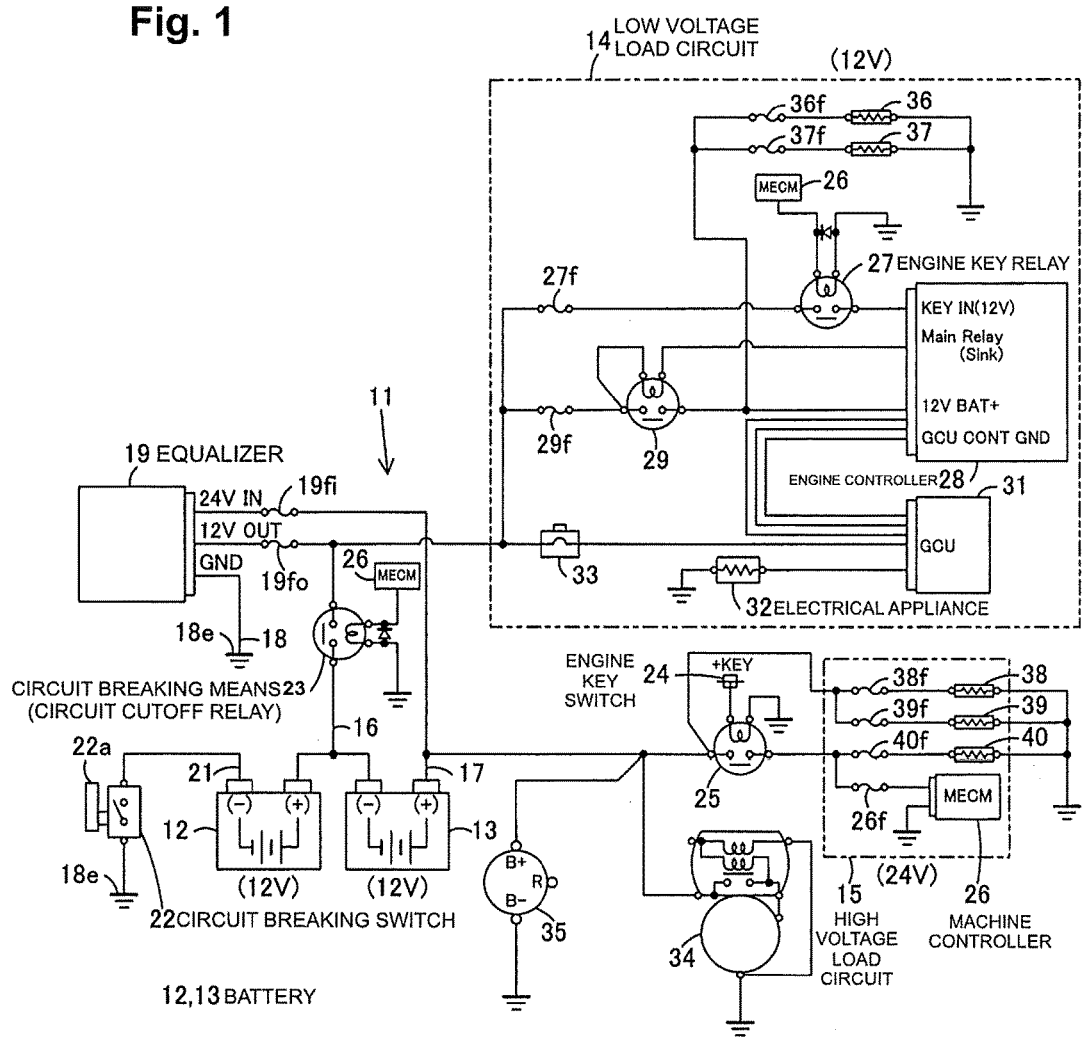
FIG. 1 is an electrical circuit diagram showing a power supply device for vehicles according to a first embodiment of the present invention.
Figure 2:
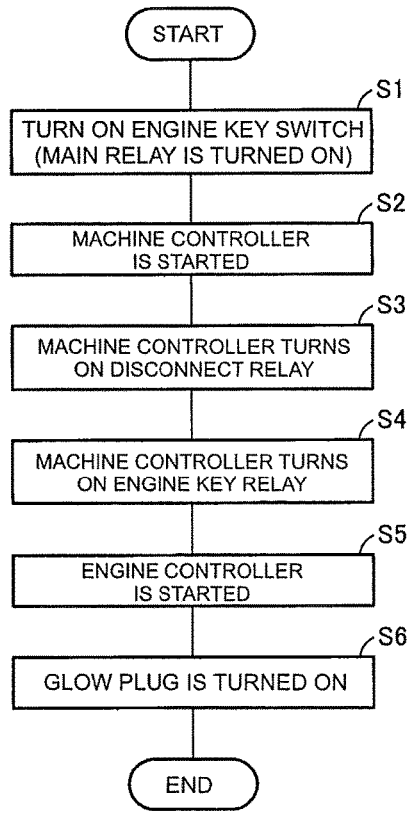
FIG. 2 is a flowchart showing a procedure of starting an engine by the power supply device.

FIGS. 1 and 2 show a power supply device for vehicles according to a first embodiment of the present invention. In a working machine such as a relatively small-sized hydraulic excavator, for example, a power supply circuit 11 of 12 V and 24 V is used as shown in FIG. 1 to deal with the case where a 24 V power supply is required for a machine body system and a 12 V power supply is required for an engine system.

The power supply circuit 11 has a low voltage load circuit 14 that is connected to a battery 12 as a part of a plurality of batteries 12 and 13 which are connected in series, and a high voltage load circuit 15 that is connected between both ends of the plurality of batteries 12 and 13 and that is operated at a higher voltage than the low voltage load circuit 14.

An equalizer 19 that prevents unsymmetrical wear of the batteries 12 and 13 is connected between circuits 16 and 17 that output a low voltage (12 V) and a high voltage (24 V) from the plurality of batteries 12 and 13 to the low voltage load circuit 14 and the high voltage load circuit 15, and a ground circuit 18 that is connected to a ground 18e. Fuses 19fi and 19fo are connected to a 24 V input terminal and a 12 V output terminal of the equalizer 19.

In a ground circuit that connects the ground 18e and the minus terminal (−) of the low voltage side battery 12 that is connected to the ground 18e out of the batteries 12 and 13 connected in series, there is a disconnect switch 22 as a circuit breaking switch that can electrically cut off the low voltage side battery 12 by breaking the ground circuit.

The disconnect switch 22 has an operating unit 22a that is manually operated by an operator or the like who performs maintenance of the vehicle or that is operated in conjunction with the open and close operation of the maintenance door. The operating unit 22a turns off the disconnect switch 22 by opening the contact at the opening time of the maintenance door, and turns on the disconnect switch 22 by closing the contact at the closing time of the door, for example.

In the case of the power supply circuit 11 having the equalizer 19, the one disconnect switch 22 provided in the ground circuit 18 cannot cut off both the two batteries 12 and 13 from the load circuits 14 and 15, and therefore, it is necessary to make it possible to cut off the two load circuits 14 and 15.

Accordingly, in circuits 17-16 that are laid out from the plus terminal (+) of the high voltage side battery 13 out of the batteries 12 and 13 connected in series, to the minus terminal (−) of the battery 13 via the internal resistance of the equalizer 19, there is provided a disconnect relay 23 as circuit breaking means that can electrically cut off the high voltage side battery 13 by breaking the circuits 17-16.

A main relay 25 that is turned on by on-operation of the engine key switch 24 for starting the engine is connected to the circuit 17 for 24 V. Further, a machine controller 26 of the high voltage load circuit 15 that is started by turning on the engine key switch 24 is connected to the main relay 25 via a fuse 26f.

The disconnect relay 23 serving as circuit breaking means that is provided in the circuits 17-16 between the equalizer 19 and the battery 13 is a circuit cutoff relay that is turned on by the start of the machine controller 26 and that breaks the circuits 17-16 until the circuits 17-16 communicate with each other.

The low voltage load circuit 14 includes an engine key relay 27 that is turned on by the machine controller 26 after the disconnect relay 23 has been turned on, the engine key relay 27 being connected to the disconnect relay 23 via a fuse 27f. Further, the low voltage load circuit 14 also includes an engine controller 28 that is started by the turn on of the engine key relay 27. A main relay 29 that supplies 12 V to the engine controller 28 is connected to the disconnect relay 23 via a fuse 29f. Further, a glow control unit 31 is connected to the engine controller 28.

The glow control unit 31 controls conduction to a glow plug 32 as an electrical appliance that supports ignition of the diesel engine. The glow control unit 31 is operated by starting the engine controller 28, so that conduction to the glow plug 32 becomes possible. A glow breaker 33 for preventing the excess current is connected to the input side of the glow control unit 31.

A stator motor 34 for vehicles and an alternator 35 for power generation are connected in parallel to the circuit 17 for 24 V.

Electrical appliances 36 and 37 for the engine of a 12 V load are connected to the main relay 29 of the low voltage load circuit 14 via fuses 36f and 37f. Further, electrical appliances 38, 39, and 40 for a machine body of a 24 V load are connected to the high voltage load circuit 15 via fuses 38f, 39f, and 40f.

Next, a control procedure associated with the engine start operation using the machine controller 26 will be described with reference to FIG. 2.

(Step S1)
When the engine key switch 24 is turned on based on the assumption that the disconnect switch 22 is in the on state at the engine start time, the main relays 25 and 29 are turned on. At this stage, the engine controller 28 is not started.

(Step S2)
When the main relay 25 is turned on, the machine controller 26 is started.

(Step S3)
When the machine controller 26 is started, the machine controller 26 first turns on the disconnect relay 23 by a programmed procedure.

(Step S4)
Thereafter, the machine controller 26 turns on the engine key relay 27.

(Step S5)
When the engine key relay 27 is turned on, the engine controller 28 is started.

(Step S6)
When the engine controller 28 is started, the glow control unit 31 is started, and the glow control unit 31 starts controlling conduction to the glow plug 32.

When the order of turning on the disconnect relay 23 in Step S3 and turning on the engine key relay 27 in Step S4 have been reversed, for example, the engine controller 28 is started and the glow plug 32 operates in the state where the disconnect relay 23 is off. That is, the glow plug 32 can be energized in the state where the disconnect switch 22 is on and the disconnect relay 23 is off. Therefore, there is a risk that the excess current equal to or larger than a permissible current (40 A) flows from the 12 V terminal of the equalizer 19 to the glow plug 32 and the fuse 19fo is fused.

On the other hand, in the case of starting the disconnect relay 23 and the engine key relay 27 in the order of Steps S3 and S4 described above, when the engine key switch 24 is turned on in the state where the disconnect switch 22 is in the on state, the machine controller 26 is first started. By the machine controller 26, the disconnect relay 23 is first turned on. After the circuit 16 has been made possible to output 12 V, the engine key relay 27 of the low voltage load circuit 14 is turned on, and the engine controller 28 is started to start the glow control unit 31. Therefore, the excess current from the equalizer 19 to the glow plug 32 can be prevented, and the trouble of fusing the fuse 19fo by the excess current can be prevented.

Next, effects according to the embodiment shown in FIGS. 1 and 2 will be described.

When the equalizer 19 for preventing unsymmetrical wear of the plurality of batteries 12 and 13 connected in series is used in the power supply circuit 11 in which the low voltage load circuit 14 and the high voltage load circuit 15 are connected to the plurality of batteries 12 and 13, the circuits 17-16 are broken by turning off the disconnect switch 22 in the ground circuit 21 that is connected to the minus terminal (−) of the low voltage side battery 12, and by turning off the disconnect relay 23 as circuit breaking means provided in the circuits 17-16 which are laid out from the plus terminal (+) of the high voltage side battery 13 to the minus terminal (−) of the battery 13 via the internal register of the equalizer 19. Therefore, it is possible to forcibly cut off the power supply at the maintenance work time and the like, and it is also possible to prevent the occurrence of unsymmetrical wear of the battery 13 caused by the internal resistance in the equalizer 19 in the case of combinedly using the equalizer 19 and the disconnect switch 22.

Further, as described above, at the start time of the engine, the machine controller 26 controls the disconnect relay 23 to be turned on prior to the engine key relay 27. By making the equalizer 19 function before the engine key relay 27 starts the engine controller 28, it is possible to prevent the excess current from the equalizer 19 to the glow plug 32 that occurs in conjunction with the start of the engine controller 28, and application of an equalizer of a smaller size becomes possible.

Further, because only the disconnect relay 23 is added to the disconnect switch 22, the sizes and the number of parts can be minimized, the power supply device can be also mounted on a relatively small class vehicle that has little room in the device layout on the machine body, and cost increase can be suppressed.

In addition, because the disconnect relay 23 can be automatically operated, both the two batteries 12 and 13 can be cut off from the circuit by only turning off the disconnect switch 22 as the battery cutoff operation. Therefore, better operability is provided, and the failure in cutoff of a battery other than the disconnect switch 22 can be prevented.

Figure 3:
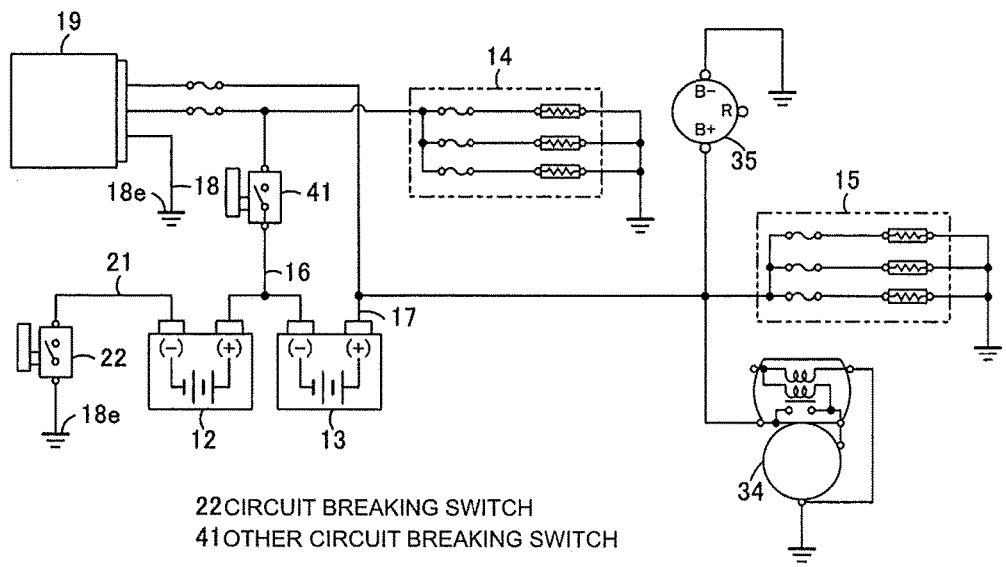
FIG. 3 is an electrical circuit diagram showing a power supply device for vehicles according to a second embodiment of the present invention.
Figure 4:
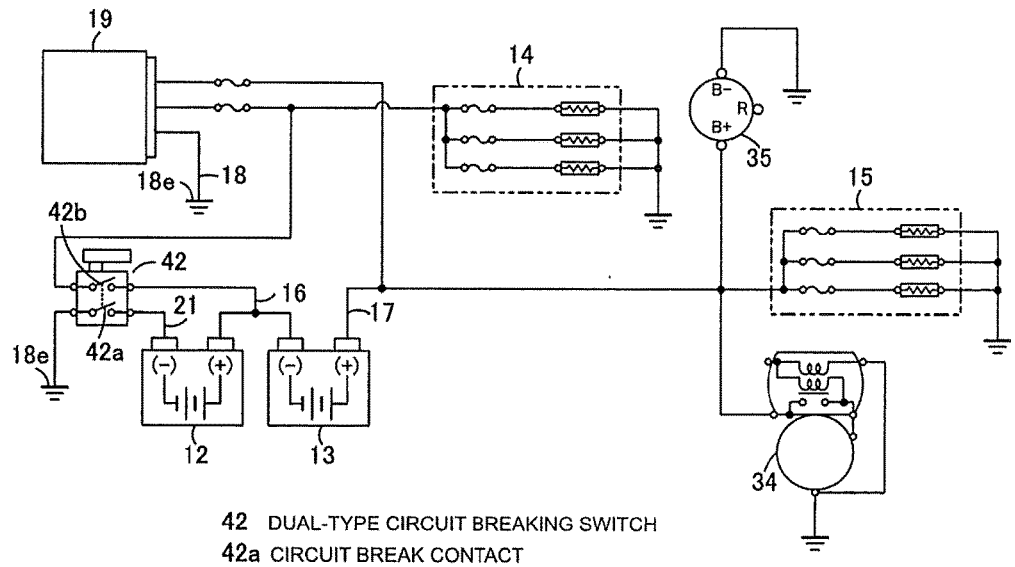
FIG. 4 is an electrical circuit diagram showing a power supply device for vehicles according to a third embodiment of the present invention.
Figure 5:
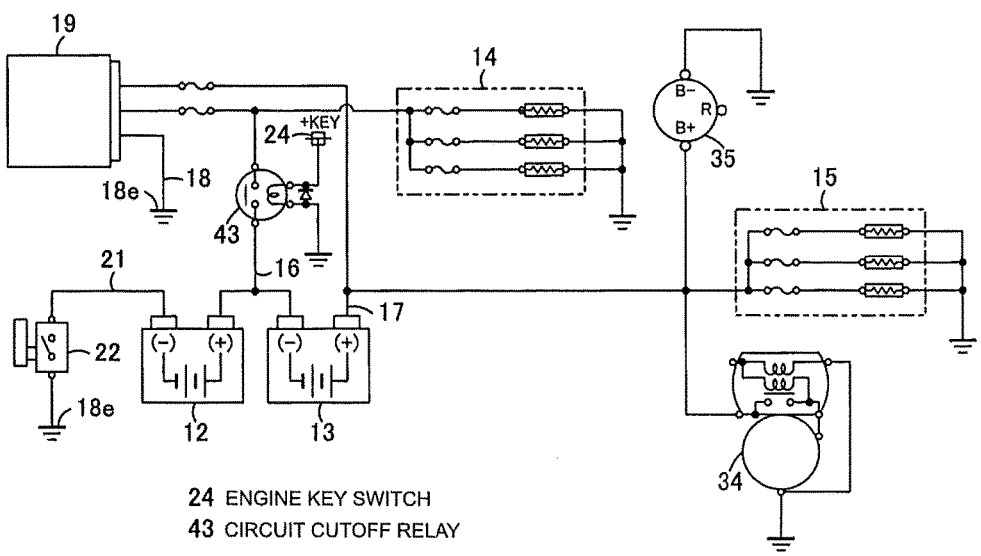
FIG. 5 is an electrical circuit diagram showing a power supply device for vehicles according to a fourth embodiment of the present invention.
Figure 6:
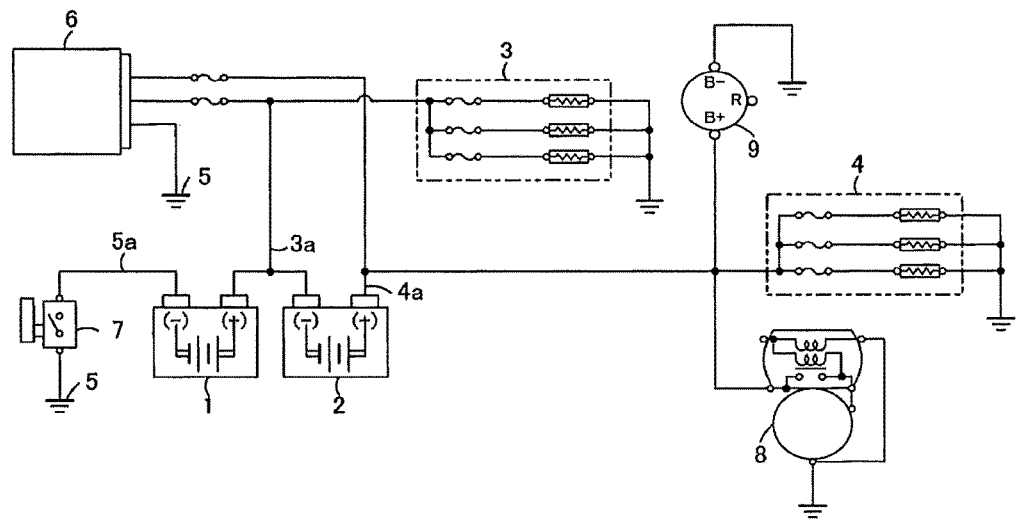
FIG. 6 is an electrical circuit diagram for explaining a background art of a power supply device for vehicles.

Next, FIG. 3 shows a power supply device for vehicles according to a second embodiment of the present invention, FIG. 4 shows a power supply device for vehicles according to a third embodiment, and FIG. 5 shows a power supply device for vehicles according to a fourth embodiment. In FIG. 3 to FIG. 5, parts that are the same as those shown in FIG. 1 are attached with identical symbols, and their description will be omitted. Display of the engine key switch 24, the main relay 25, and the engine controller 28 will be omitted.

In the second embodiment shown in FIG. 3, as circuit breaking means that is separate from the disconnect switch 22 provided in the ground circuit 18 which connects the minus terminal (−) of the low voltage side battery 12 out of the plurality of batteries 12 and 13 and the ground 18e, a disconnect switch 41 as another circuit breaking switch is provided in the circuits 17-16 that are laid out from the plus terminal (+) of the high voltage side battery 13 to the minus terminal (−) of the battery 13 via the internal resistance of the equalizer 19.

According to the present embodiment, the circuits 17-16 that are connected to the high voltage side battery 13 are cut off, by turning off the disconnect switch 22 in the ground circuit 21 that is connected to the low voltage side battery 12 and by turning off the disconnect switch 41 in the circuits 17-16. Therefore, it is possible to forcibly cut off the power supply at the maintenance work time and the like, and it is also possible to prevent unsymmetrical wear of the battery 13 caused by the internal resistance in the equalizer 19 in the case of combinedly using the equalizer 19 and the disconnect switch 22.

In the third embodiment shown in FIG. 4, the power supply device includes a dual disconnect switch 42 as a dual-type circuit breaking switch that has two circuit break contacts 42a and 42b which are integrally turned on and off. The one circuit break contact 42a of the dual disconnect switch 42 is provided in the ground circuit 21 that connects the minus terminal (−) of the low voltage side battery 12 out of the plurality of batteries 12 and 13 and the ground 18e, and the circuit break contact 42a corresponds to the disconnect switch 22 shown in FIG. 1 or FIG. 3.

The other circuit break contact 42b is provided in the circuits 17-16 that are laid out from the plus terminal (+) of the high voltage side battery 13 to the minus terminal (−) of the battery 13 via the internal resistance of the equalizer 19, and the circuit break contact 42b corresponds to the circuit breaking means 23 and 41 shown in FIG. 1 or FIG. 3.

According to the present embodiment, when the dual disconnect switch 42 is off-operated, the two circuit break contacts 42a and 42b are simultaneously turned off, so that the ground circuit 21 of the low voltage side battery 12 is cut off by the circuit break contact 42a, and the circuits 17-16 of the high voltage side battery 13 are cut off by the circuit break contact 42b. Therefore, it is possible to forcibly cut off the power supply at the maintenance work time and the like, and it is also possible to prevent unsymmetrical wear of the battery 13 caused by the internal resistance in the equalizer 19 in the case of combinedly using the equalizer 19 and the disconnect switch 22.

Further, the dual disconnect switch 42 can simultaneously set the two circuit break contacts 42a and 42b to the off state, by the off-operation of the dual disconnect switch 42. Therefore, better operability is provided, and the failure in cutoff of one battery can be prevented.

In the fourth embodiment shown in FIG. 5, as circuit breaking means, separately from the disconnect switch 22 that is provided in the ground circuit 21 which connects the minus terminal (−) of the low voltage side battery 12 and the ground 18e, there is provided a disconnect relay 43 as a circuit cutoff relay that is turned on in conjunction with the on-operation of the engine key switch 24, in the circuits 17-16 that are laid out from the plus terminal (+) of the high voltage side battery 13 to the minus terminal (−) of the battery 13 via the internal resistance of the equalizer 19.

According to the present embodiment, the ground circuit 21 of the low voltage side battery 12 is cut off by the disconnect switch 22, and the circuits 17-16 of the high voltage side battery 13 are cut off by turning off the disconnect relay 43 as circuit means provided in the circuits 17-16, in conjunction with the key off operation. Therefore, it is possible to forcibly cut off the power supply at the maintenance work time and the like, and it is also possible to prevent unsymmetrical wear of the battery 13 caused by the internal resistance in the equalizer 19 in the case of combinedly using the equalizer 19 and the disconnect switch 22.

Further, the disconnect relay 43 is automatically set to the off state in conjunction with the off-operation of the engine key switch 24. For the battery cutoff operation, it is sufficient to off operate only one disconnect switch 22. Therefore, better operability is provided, and the failure in cutoff of a battery other than the disconnect switch 22 can be prevented.

INDUSTRIAL APPLICABILITY

The present invention has industrial applicability for business operators who are engaged in manufacturing, marketing, and the like of a power supply device for vehicles.

EXPLANATION OF REFERENCE NUMERALS 12, 13 BATTERY
14 LOW VOLTAGE LOAD CIRCUIT
15 HIGH VOLTAGE LOAD CIRCUIT
19 EQUALIZER
22 DISCONNECT SWITCH AS CIRCUIT BREAKING SWITCH
23 CIRCUIT CUTOFF RELAY (DISCONNECT RELAY) AS CIRCUIT BREAKING MEANS
24 ENGINE KEY SWITCH
26 MACHINE CONTROLLER
27 ENGINE KEY RELAY
28 ENGINE CONTROLLER
32 GLOW PLUG AS ELECTRICAL APPLIANCE
41 OTHER CIRCUIT BREAKING SWITCH (DISCONNECT SWITCH) AS CIRCUIT BREAKING MEANS
42 DUAL DISCONNECT SWITCH AS DUAL-TYPE CIRCUIT BREAKING SWITCH
42a, 42b CIRCUIT BREAK CONTACT
43 CIRCUIT CUTOFF RELAY (DISCONNECT RELAY) AS CIRCUIT BREAKING MEANS

The invention claimed is:
1. A power supply device for a vehicle, the vehicle including
 a plurality of batteries connected in series,
 a low voltage load circuit connected to a part of the plurality of batteries, and
 a high voltage load circuit connected to the plurality of batteries, an operating voltage of the high voltage load circuit being higher than an operating voltage of the low voltage load circuit,
the power supply device comprising:
 an engine key switch for starting an engine of the vehicle;
 an equalizer connected to the plurality of batteries and configured to prevent unsymmetrical wear of each battery of the plurality of batteries;
 a circuit breaking switch that can electrically cut off a first battery of the plurality of batteries;
 circuit breaking means that can electrically cut off a second battery of the plurality of batteries,
 wherein the high voltage load circuit includes a machine controller that is started by turning the engine key switch to an on-position,
 wherein the circuit breaking means includes a circuit cutoff relay that is energized by starting the machine controller, and
 wherein the low voltage load circuit includes:
 an engine key relay that is energized by starting the machine controller;
 an engine controller that is started by energizing the engine key relay; and
 an electrical appliance that can be energized by starting the engine controller.
2. The power supply device according to claim 1, wherein the circuit breaking switch is a first circuit breaking switch, and the circuit breaking means is a second circuit breaking switch that is separate from the first circuit breaking switch.

3. The power supply device according to claim 1, further comprising a dual-type circuit breaking switch that has two circuit break contacts which are integrally turned on and off, wherein
the circuit breaking switch is one circuit break contact of the two circuit break contacts, and
the circuit breaking means is another circuit break contact of the two circuit break contacts.

* * * * *